June 30, 1942.   L. H. SMITH   2,288,329
MOUNTING OR JOINT STRIP
Filed Nov. 5, 1940
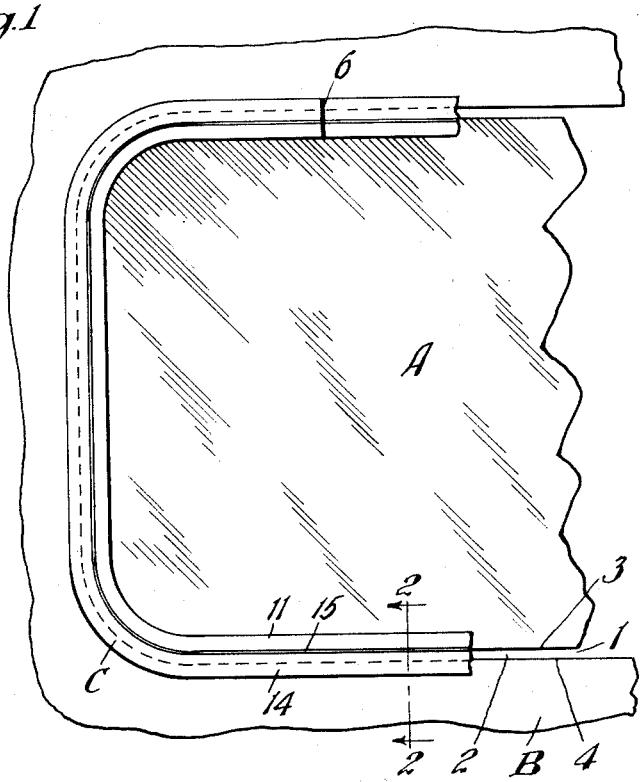
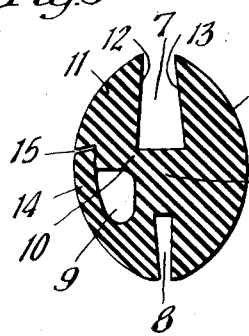
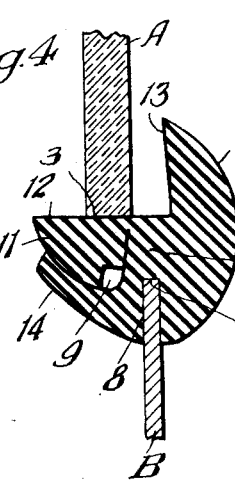
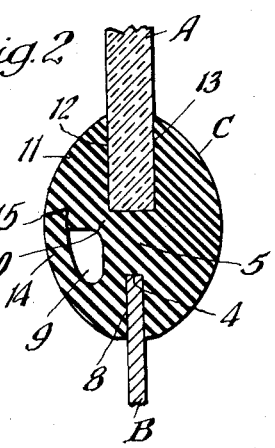
Inventor
Lawrence H. Smith
By George I. Haight
Atty.

Patented June 30, 1942

2,288,329

UNITED STATES PATENT OFFICE 2,288,329

MOUNTING OR JOINT STRIP

Lawrence H. Smith, Chicago, Ill., assignor to General American Aerocoach Company, Chicago, Ill., a corporation of Delaware Application November 5, 1940, Serial No. 364,422

3 Claims. (Cl. 189—78)

This invention has to do with the mounting of window glass panes in window openings, more especially the window openings in motor vehicles, cars, and the like.

My invention consists of a mounting strip preferably of an elastic material such as rubber, which is interposed between the marginal portions of the glass and the frame defining the window opening and which is in the form of a body of rubber having recesses or channels the walls of which overlap and snugly fit the marginal faces of the glass and frame to provide a waterproof and rattleproof joint between the glass and frame. My invention further consists in a joint strip made of rubber in one piece, having integral deformable means permitting the assembly thereof with the glass and frame, and the locking thereof after assembly.

The accompanying drawing illustrates an embodiment of my invention.

Fig. 1 is a view of a portion of a window frame and window glass mounted therein by means of a joint strip embodying my invention;

Fig. 2 is an enlarged detail section on the line 2—2 of Fig. 1;

Fig. 3 is an enlarged transverse section of the joint strip in normal or reposed condition; and Fig. 4 is an enlarged section of the joint strip in position but in deformed condition to facilitate the setting of the glass pane.

In the embodiment of my invention shown in the drawing, A indicates a pane or sheet of glass mounted in a frame B by means of the mounting or joint strip C. The frame in this case is the panel or wall in which an opening 1 has been cut of the shape and size desired, the glass pane being less in size than the opening to form a space 2 between the marginal edge 3 of the glass and the marginal edge 4 of the frame for the reception of the body portion 5 of the mounting strip. The glass pane, although thicker than the frame, is mounted substantially in the plane of said frame.

The mounting or joint strip C is preferably in one continuous length so that it can be arranged to encircle the glass panel and its ends brought together to meet at any convenient point 6. The mounting strip is preferably made of elastic deformable material such as rubber, which may be readily disposed around the frame and glass and will snugly fit both to form a waterproof joint and to serve as a cushion mounting relieving the glass of stresses.

The mounting strip is preferably generally oval in cross section and has two continuous grooves or channels 7 and 8 for the reception of the marginal portions of the glass and frame respectively. The strip is so formed that when in repose or before use, the side walls of the channels converge toward each other so that they must be spread apart against the elasticity of the rubber to accommodate the glass and frame whereby a tight joint is provided.

The mounting strip has within its body a hollow tubular portion 9 which extends throughout the length thereof. This tubular hollow is located in the body at one side of the plane of the glass and frame, and the relation of its wall to one of the channels (in this case the channel 7) is such that a relatively narrow or reduced portion 10 of rubber lies between the channel 7 and hollow 9. This reduced portion forms a more easily flexible portion somewhat in the nature of a hinge which enables the upper side wing or portion 11 forming one side wall 12 of channel 7 to be bent or swung outwardly, as shown in Fig. 4, so that the wall 12 is substantially at right angles to the opposite wall 13 and in the plane of the bottom wall of the channel. The purpose of this construction is to facilitate the setting of the glass sheet in channel 7 by temporarily removing the wing portion 11 from the path of the glass pane. After the glass has been inserted in place against the opposite wall 13 of the channel, the wing is swung back to its normal position against the glass by the elasticity of the rubber. The lower outer portion 14 of the rubber which forms the outer wall of the hollow is separated from the upper wing 11 by the angularly related longitudinal slot or slit 15 thus enabling the portion 14 to be swung or flexed outwardly as a wing to open the hollow 9 and thus provide a seat or channel for the wing 11 when said wing is swung outwardly to admit the glass pane, as shown in Fig. 4. After the wing 11 has been returned to normal position, the wing 14 likewise returns to normal position due to the elasticity of the rubber. The upper edge portion of wing 14 thus seats itself in the notch formed in the wing 11 by the angular slot 15 and forms an abutment which locks the wing 11 against outward movement, thus holding the assembly of glass pane and mounting strip snugly in position against displacement. The angular relation of the upper edge of wing 14 and the walls of the slot 15 is such that the compressive stresses that the rubber is under tends to urge the wing 14 into tighter engagement. In fact, this beveled relation of the wing edge and slot 15 acts as a lock to prevent displacement of wing 14 unless force is applied by a tool to overcome the locking action. A suitable tool may be provided for this purpose when it is desired to remove the glass pane.

It is obvious that the same construction may also be provided in connection with the lower channel 8 for the frame instead of the glass pane, or each channel may have a deformable wall and locking wing. Ordinarily this is not necessary, however, because the joint strip may be first assembled with the frame without the glass pane, and then the pane fitted therein.

I claim:

1. In a mounting strip of the class described an elongated flexible strip of rubber adapted to be interposed between the adjacent edges of the parts to be joined and having integral wing portions forming a channel for one of said parts and extending along the marginal faces of the parts to compressively engage said faces, said body having a tubular longitudinal hollow, one of said wing portions being capable of deflection against the elasticity of said rubber and into said hollow to permit the placing in or removal of one of said parts from said channel, and an integral portion of said body normally closing said hollow and bearing against said wing portion to prevent deflection of the wing, said integral portion being flexible to open said hollow.

2. A device for joining panels in edge to edge relation comprising an elastic rubber strip having integral wing portions adapted to overlie the marginal faces of the panels to be joined and having a normally closed longitudinal hollow into which, when open, one of said wing portions is adapted to be flexed against the elasticity of the rubber, and an integral abutment normally closing said hollow and bearing against said flexible wing portion to compressively hold the wing portion against flexing, said abutment being flexible to open said hollow.

3. A device for joining panels in edge to edge relation comprising an elastic rubber strip having integral wing portions adapted to overlie the marginal faces of the panels to be joined and having a normally closed longitudinal hollow into which, when open, one of said wing portions is adapted to be flexed against the elasticity of the rubber, said wing portion having an angular shoulder, and an integral abutment member normally closing said hollow and having a beveled edge seated against said shoulder and compressively holding said wing portion against flexing, said abutment member being flexible to open said hollow.

LAWRENCE H. SMITH.